United States Patent [19]

Takats et al.

[11] Patent Number: 5,274,554
[45] Date of Patent: Dec. 28, 1993

[54] MULTIPLE-VOTING FAULT DETECTION SYSTEM FOR FLIGHT CRITICAL ACTUATION CONTROL SYSTEMS

[75] Inventors: Imre J. Takats; Charles C. Chenoweth, both of Bellevue, Wash.

[73] Assignee: The Boeing Company, Seattle, Wash.

[21] Appl. No.: 649,616

[22] Filed: Feb. 1, 1991

[51] Int. Cl.⁵ ............................................. G06F 11/16
[52] U.S. Cl. ........................... 364/424.03; 244/76 R; 318/564; 371/68.1
[58] Field of Search ............. 364/424.01, 424.03, 364/434, 184, 186, 187; 371/9.1, 68.1, 68.2, 68.3, 67.1; 318/563, 564, 565; 244/76 R

[56] References Cited

U.S. PATENT DOCUMENTS

| | | | |
|---|---|---|---|
| 4,032,757 | 6/1977 | Eccles | 371/9.1 X |
| 4,096,989 | 6/1978 | Tawfik | 371/68.2 |
| 4,130,241 | 12/1978 | Meredith et al. | 318/564 X |
| 4,162,438 | 7/1979 | Osder | 318/564 |
| 4,209,734 | 6/1980 | Osder | 318/564 |
| 4,327,437 | 4/1982 | Gelderloos | 371/68.3 |
| 4,345,191 | 8/1982 | Takats et al. | 318/564 |
| 4,356,546 | 10/1982 | Whiteside et al. | 371/67.1 |
| 4,370,706 | 1/1983 | Doninger et al. | 364/184 |
| 4,472,780 | 9/1984 | Chenoweth et al. | 364/434 |
| 4,517,639 | 5/1985 | Ferrell et al. | 364/186 |
| 4,622,667 | 11/1986 | Yount | 364/434 |
| 4,649,484 | 3/1987 | Herzog et al. | 364/434 X |
| 4,774,709 | 9/1988 | Tulplue et al. | 371/68.1 X |
| 4,807,516 | 2/1989 | Takats | 91/353 |
| 4,887,214 | 12/1989 | Takats et al. | 364/424.01 |
| 4,916,612 | 4/1990 | Chin et al. | 364/424.01 |
| 5,016,249 | 5/1991 | Hurst et al. | 371/68.3 X |

Primary Examiner—Thomas G. Black
Assistant Examiner—Collin W. Park
Attorney, Agent, or Firm—Joan H. Pauly

[57] ABSTRACT

A control system includes a dual actuator (2) and primary and secondary controllers (20, 22), each of which has two control channels. In a normal mode of operation, the primary controller (20) controls both valves (32, 38) of the actuator (2). Each primary channel generates a model signal and a monitoring signal corresponding to expected and actual operation of the actuator, respectively. The two signals from each channel are communicated to the other channel. Each channel monitors itself as well as the other channel by comparing model and monitoring signals; and is also similarly redundantly monitored by the other channel of the controller (20). Each channel independently compares its own signals with the signals from the other channel. Each of the two channels has a deactivating switch responsive to a fault status signal from either of the two channels to thereby allow deactivation of a failed channel even when the failure in such channel prevents it from deactivating itself. The channels of the secondary controller (22) are similarly redundantly monitored by themselves and each other. Communication links are maintained between the primary channels, the secondary channels, and between the primary and secondary channels.

19 Claims, 9 Drawing Sheets

| Possibilities | Controller "1" | | Signals from LVDTs to comparators | | | | Failure signals from comparators | | | | | | | Controller "2" | | EHV "X" | | EHV "B" | | Actuator | | Signal to bypass valve | | Note |
|---|---|---|---|---|---|---|---|---|---|---|---|---|---|---|---|---|---|---|---|---|---|---|---|---|
| | CPU 1A | CPU 1B | LVDT 1A | LVDT A1 | LVDT 1B | LVDT B1 | E$_{1P}$ | E$_{2P}$ | E$_{3P}$ | E$_{4P}$ | E$_{3P}$ | E$_{3P}$ | E$_{4P}$ | CPU 2A | CPU 2B | Prim | Sec | Prim | Sec | A | B | A | B | |
| 1 | 1 | 1 | 1 | 1 | 1 | 1 | 0 | 0 | 0 | 0 | 0 | 0 | 0 | 1 | 1 | 1 | 0 | 1 | 0 | 1 | 1 | 0 | 0 | Normal Operation |
| 2 | 1 | 1 | 0 | 0 | 1 | 1 | 1 | 1 | 0 | 0 | 0 | 0 | 0 | 1 | 1 | F | 1 | 0 | 1 | 1 | 1 | 1 | 0 | Single component failure in a primary channel |
| 3 | 1 | 1 | 1 | 1 | 0 | 0 | 0 | 0 | 1 | 1 | 0 | 0 | 0 | 1 | 1 | F | 1 | 0 | 1 | 1 | 1 | 1 | 0 | Single component failure in a primary channel |
| 4 | 1 | 1 | 1 | 0 | 1 | 0 | 1 | 0 | 1 | 0 | 1 | 1 | 1 | 1 | 1 | 0 | 1 | F | 1 | 1 | 1 | 0 | 1 | Single component failure in a primary channel |
| 5 | 1 | 1 | 1 | 1 | 0 | 0 | 0 | 0 | 0 | 0 | 1 | 1 | 1 | 1 | 1 | 0 | 1 | F | 1 | 1 | 1 | 0 | 1 | Single component failure in a primary channel |
| 6 | 1 | 0 | 1 | 1 | 1 | 1 | 1 | 1 | 1 | 1 | 1 | 1 | 1 | 1 | 1 | F | 1 | F | 1 | 1 | 1 | 1 | 1 | CPU 1B failure |
| 7 | 0 | 1 | 0 | 0 | 0 | 0 | 0 | 0 | 0 | 0 | 0 | 0 | 0 | 1 | 1 | F | 1 | F | 1 | 1 | 1 | 1 | 1 | CPU 1A failure |
| 8 | 0 | 0 | 0 | 0 | 0 | 0 | 1 | 1 | 1 | 1 | 1 | 1 | 1 | 1 | 1 | F | 1 | F | 1 | 1 | 1 | 1 | 1 | Controller 1 failure (CPU 1A + CPU 1B) |
| 9 | 1 | 1 | 1 | 1 | 1 | 1 | 0 | 0 | 0 | 0 | 0 | 0 | 0 | 0 | 1 | 1 | F | 1 | 0 | 1 | 1 | 1 | 0 | CPU 2A failure |
| 10 | 1 | 1 | 1 | 1 | 1 | 1 | 0 | 0 | 0 | 0 | 0 | 0 | 0 | 1 | 0 | 1 | 0 | 1 | F | 1 | 1 | 0 | 1 | CPU 2B failure |
| 11 | 1 | 1 | 1 | 1 | 1 | 1 | 0 | 0 | 0 | 0 | 0 | 0 | 0 | 0 | 0 | 1 | F | 1 | F | 1 | 1 | 1 | 1 | Loss of controller 2 (CPU 2A + CPU 2B) |

Note 1: 0 - Failed; 1 - Operational

Note 2: 0 - No error signals; 1 - Error signals

Note 3: 0 - Failed; 1 - Active/standby

Note 4: 0 - Active/standby; 1 - Operational; F - Failed

Note 5: 0 - Failed; 1 - Operational

Note 6: 0 - NO BYPASS SIGNAL; 1 - ONE SIGNAL; B - BYPASS

| Possibilities | Controller "2" CPU 2A | Controller "2" CPU 2B | Signals from LVDTs to comparators LVDT 2A | LVDT A2 | LVDT 2B | LVDT B2 | Failure signals from comparators E1s | E2s | E3s | E4s | E5s | E6s | Controller "1" CPU 1A | CPU 1B | EHV "A" Prim | EHV "A" Sec | EHV "B" Prim | EHV "B" Sec | Actuator A | Actuator B | Signal to bypass valve A | Signal to bypass valve B | Note |
|---|---|---|---|---|---|---|---|---|---|---|---|---|---|---|---|---|---|---|---|---|---|---|---|
| 1 | 1 | 1 | 1 | 1 | 1 | 1 | 0 | 0 | 0 | 0 | 0 | 0 | 1 | 0 | 0 | 1 | F | 1 | 1 | 1 | 0 | 1 | Operation after failure in CPU 1B |
| 2 | 1 | 1 | 0 | 1 | 1 | 1 | 1 | 1 | 0 | 0 | 0 | 0 | 1 | 0 | 1 | F | F | F | 1 | 1 | 0 | 1 | Single component failure in a secondary channel |
| 3 | 1 | 1 | 1 | 0 | 1 | 1 | 0 | 0 | 1 | 1 | 1 | 0 | 1 | 0 | F | F | F | F | 1 | 1 | 1 | 1 | Single component failure in a secondary channel |
| 4 | 1 | 1 | 1 | 1 | 0 | 1 | 0 | 1 | 0 | 0 | 0 | 1 | 1 | 0 | 0 | 1 | F | F | 1 | 0 | 1 | B | Single component failure in a secondary channel |
| 5 | 1 | 0 | 1 | 1 | 1 | 0 | 0 | 0 | 1 | 1 | 1 | 1 | 1 | 0 | 0 | F | F | F | 1 | 0 | 0 | B | Single component failure in a secondary channel |
| 6 | 0 | 1 | 1 | 1 | 0 | 0 | 1 | 1 | 1 | 1 | 1 | 1 | 1 | 0 | 0 | F | F | F | 1 | 0 | 0 | B | CPU 2B failure |
| 7 | 1 | 0 | 0 | 0 | 1 | 0 | 1 | 1 | 1 | 1 | 1 | 0 | 1 | 0 | 1 | F | F | F | 1 | 1 | 0 | 1 | CPU 2A failure |
| 8 | 0 | 0 | 0 | 0 | 0 | 0 | 1 | 1 | 1 | 1 | 0 | 0 | 1 | 0 | 1 | F | F | F | 1 | 0 | 1 | B | Loss of controller 2 (CPU 2A + CPU 2B) |
| 9 | 1 | 1 | 1 | 1 | 1 | 1 | 0 | 0 | 0 | 0 | 0 | 0 | 0 | 0 | F | 1 | F | 1 | 1 | 1 | 1 | 1 | CPU 1A failure as a second failure |

Note 1: 0 - Failed; 1 - Operational

Note 2: 0 - No error signals; 1 - Error signals

Note 3: 0 - Failed; 1 - Active/standby

Note 4: 0 - Active/standby; 1 - Operational; F - Failed

Note 5: 0 - Failed; 1 - Operational

Note 6: 0 - NO BYPASS SIGNAL; 1 - ONE SIGNAL; B - BYPASS

Fig. 11

MULTIPLE-VOTING FAULT DETECTION SYSTEM FOR FLIGHT CRITICAL ACTUATION CONTROL SYSTEMS

TECHNICAL FIELD

This invention relates to fault detection and correction in flight critical actuation control systems having a plurality of actuation and control channels and, more particularly, to a fault tolerant control system in which the operation of each channel is normally monitored by at least two channels which are in communication with each other, and a failure in any one of the channels is redundantly detected by comparison voting in each of the monitoring channels.

BACKGROUND INFORMATION

The safe operation of aircraft obviously depends upon reliable flight critical actuation control systems. Therefore, it is desirable to provide a high level of fault tolerance in such systems. Fault tolerance of systems in general can be classified based on the outcome of a failure in the system. A "fail operational" system may be defined as one in which a first failure in the system will not affect the operation of the system, i.e. the system remains fully operational following a first failure. A "fail passive" system may be defined as one in which a first failure will result in an inoperable state of the system but not in a freezing of the system or runaway operation of the system. In a system which has neither fail operational nor fail passive fault tolerance, a first failure can be catastrophic. Modern flight critical aircraft control systems typically require built-in fault tolerance that operates automatically to detect failures and maintain operation of the control system by correcting or reconfiguring the system to isolate the failure and its effect.

Virtually all known flight critical control systems incorporate some degree of fault tolerance by the use of redundant components. An example is the type of dual, or tandem, hydraulic actuator disclosed in U.S. Pats. No. 4,807,516, granted Feb. 28, 1989, to one of the present applicants, Imre J. Takats; and No. 4,887,214, granted Dec. 12, 1989, to said applicant and George W. Aziz. The actuator has two redundant halves coupled to a flight control surface through a common actuating rod. The two halves of the actuator are preferably operated by separate hydraulic systems. Each half of the actuator is controlled by its own electrohydraulic servovovalve. Each of the servovalves may be controlled by signals applied to either of two redundant actuating coils.

The control systems disclosed in the above-cited patents include four control channels, one linked to each of the servovalve actuating coils. Control signals are generated by each channel as a function of a flight control signal from a flight control computer and a feedback signal indicative of the position of the hydraulic actuator rod. Two of the channels are primary channels and control the operation of the valves during normal operation of the system. The other two channels are .secondary channels and control the valves in a fail operational mode of the system. In the event of a failure in a primary channel, its associated valve coil, or a feedback signal generating device associated with the channel, the primary channel can be switched out and the control of the valve switched over to a secondary channel. Thus, each half of the tandem actuator can continue to operate after a failure or malfunction in a primary control channel or one of its associated elements. In other words, the system is potentially fail operational.

In order to realize the fail operational capabilities of the control systems described above and other types of fail operational systems, it is necessary to detect the failure and accomplish the switching of control from the failed channel to an operational channel. One approach is for each channel to detect its own failure and signal its redundant channel to take over operation. A drawback of this approach is that the failed channel may not be capable of recognizing its own failure. This leads to the potentially serious problem of undetected failures.

A number of known flight control systems have addressed the problem of undetected failures by providing for force voting of the actuator operation. In other words, the effect of the failed channel is overcome by brute force. For example, movement of a piston in a desired direction may be accomplished by three or more separate forces controlled by a corresponding number of channels. If one of the channels fails, it may resist movement of the piston in the desired direction. One of the remaining operational channels opposes the failed channel to nullify its effect, and the other operational channel or channels continue to provide movement in the desired direction. This type of system is fail operational relative to a first failure. However, when the system has only three channels and the first failure remains undetected, the next undetected failure can result in loss of, or errors in, actuator operation. If there is a first undetected failure and a second detected failure, there may be failure transients (delays in the reconfiguration of the system) large enough to be unacceptable. In addition, the method of force voting generally adds to the mechanical complexity of a system and to the weight and cost of the actuator. Provision of four, rather than three, channels increases the fault tolerance by making the system fail operational relative to a first failure and fail passive relative to a second failure, but adds to the complexity, weight, and cost of the system.

A related known approach is electrical flux summing of the control signals from a plurality of channels. When an undetected failure occurs, flux summing results in an electromagnetic version of mechanical force voting. For example, an electric force-motor may be provided with three or more coils controlled by a corresponding number of channels. The results of a failure in this type of system and the problems associated with the system are substantially the same as the results and problems discussed above in connection with mechanical force voting systems.

DISCLOSURE OF THE INVENTION

A subject of the invention is a method of detecting faults in an aircraft control system of a type having an actuator and a plurality of control channels for receiving control signals and processing the control signals to generate output signals for driving the actuator. According to an aspect of the invention, the method comprises generating, in each of the channels, a monitoring signal representative of actual operation of the actuator and a model signal corresponding to expected operation of the actuator. The monitoring signal and model signal are compared, and an operating status is determined based on the results of the comparison. Monitoring and model signals are communicated between a first one and a second one of the channels. In each of these two channels, comparisons of the signals generated therein and the signals communicated from the other channel are performed independently to determine a fault status of each of the two channels. Communication links are maintained between the control channels, including a link between the first and second channels. In each of the first and second channels, there is a deactivating switch responsive to a fault status signal from the other of the first and second channels.

The method of the invention provides redundant fault detection. Self-monitoring is carried out within each of the channels. In addition, the exchange of monitoring and model signals between the first and second channels and the independent comparisons in these channels provide a second independent mechanism for monitoring each of the first and second channels by the other of said channels. This makes it possible to detect a fault in a failed channel when the fault prevents the failed channel from itself recognizing the failure. The provision of a deactivating switch responsive to a signal from another channel provides a mechanism for ensuring that a channel which cannot recognize its own failure can nevertheless be deactivated. The overall result obtained by the method of the invention is the virtual elimination, in a reliable and cost effective manner, of both undetected failures in the dual-monitored channels and unacceptable failure transients following failures in such channels. The method avoids the problems that have been encountered in connection with the previous approach of force voting by significantly increasing the reliability of a system without adding to its mechanical complexity and without increasing the weight and cost of the actuator.

In its basic form, the method of the invention may be carried out in connection with various types of actuators, including, but not limited to, single actuators and dual actuators. It may also be carried out using different numbers of channels. It is currently anticipated that the preferred manner of practicing the method of the invention is in connection with a dual actuator and at least four control channels, including the first and second channels referred to above and two secondary channels. The method preferably comprises operating the first and second channels to drive the actuator in a normal operation mode. In response to a fault status signal from either of the first and second channels relating to either of these two channels, both channels are deactivated. Essentially simultaneously, the secondary channels are signaled to activate to drive the actuator.

When the secondary channels have been activated, operation of the secondary channels may be carried out without attempting to reactivate either of the first and second (primary) channels. However, the preferred form of the method includes steps to reactivate the nonfailed primary channel so that it may remain on a standby status ready to resume operation if there is a failure in the secondary channels. The reactivation preferably includes determining, in the secondary channels, whether there is a no fault condition in either of the primary channels. Any of the primary channels in which there is a no fault condition is signaled to reactivate to an active/standby status. The determination of whether there is a no fault condition may be made in various ways. The preferred manner of making the determination comprises comparing the output signals of the primary channels and secondary channels.

The method preferably also includes redundant failure monitoring of the secondary channels. This redundant monitoring may be accomplished by communicating the monitoring signal and model signal generated in each of the secondary channels to the other secondary channel. In each of the secondary channels, the signals are independently compared, and a deactivating switch is provided, as described above in connection with the primary channels. This redundant failure monitoring of the secondary channels is preferably carried out both in the normal operation mode when the primary channels are driving the actuator and, if applicable, after the secondary channels are activated. In the normal operation mode, the fault statuses of the secondary channels are preferably communicated to the primary channels.

The method may also include an additional fault detection procedure or procedures. In the currently preferred embodiment, first and second predetermined difference thresholds are provided, with the second threshold representing a greater deviation tolerance than the first threshold. The fault statuses are determined on the basis of the first threshold. The output signals of the first and second channels are compared to determine a failure status based on the second threshold. This additional procedure provides a mechanism for detecting faults that are not detected by the redundant monitoring described above and, therefore, further increases the reliability of the fault detection system.

The invention has apparatus aspects, as well as method aspects. The apparatus of the invention relates to a fault detection system in an aircraft control system of a type having an actuator and a plurality of control channels for receiving control signals and processing said signals to generate output signals for driving the actuator. The fault detection system comprises a monitoring device in each channel. The device interfaces with the actuator to sense actual operation of the actuator, and generates a monitoring signal. Each channel also has model logic for generating a model signal representative of expected operation of the actuator, and comparison logic for comparing the monitoring signal with the model signal. There are communication links between the channels. These links include a link between two of the channels capable of transmitting the model signals and monitoring signals in both directions. In each of these two channels, there is voter logic for independently comparing the model signals and monitoring signals of the two channels to determine a fault status of each of the two channels. The voter logic includes the comparison logic. Each of the two channels also has a deactivating switch responsive to a fault status signal from either of the two channels. As discussed above in connection with the method of the invention, the fault detection system preferably includes two primary and two secondary channels. The secondary channels are redundantly monitored and independently voted in the same manner as the two primary channels, and there is preferably a communication link between the secondary and primary channels. The system may include a comparator for comparing the output signals of the primary channels.

The method and apparatus of the invention have a number of advantages, including virtual elimination of undetected failures and unacceptable failure transients without adding to system mechanical complexity or actuator weight and cost, as discussed above. The method and apparatus of the invention are also highly versatile. The invention may be used in connection with various types of actuators and various arrangements of control channels. Moreover, the invention may be implemented using primarily software components. This gives the invention inherent design flexibility and reliability and allows it to be incorporated into a control system without significantly increasing maintenance requirements for the control system. The invention may also be put into practice using current technology, which further increases its cost effectiveness.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 10 is a truth table illustrating the voter logic in the normal operation mode and after a single failure.

BEST MODE FOR CARRYING OUT THE INVENTION

The drawings illustrate a fault detection system that is constructed in accordance with the invention and that also constitutes the best mode of the apparatus of the invention currently known to the applicants. The drawings also illustrate the best mode for carrying out the method of the invention currently known to the applicants. In the drawings, the invention is illustrated in connection with the type of four-channel control system shown in FIG. 1. It is anticipated that the primary application of the invention will be in connection with the type of system shown in FIG. 1. However, it is intended to be understood that the method and apparatus of the invention may also be used to advantage in connection with other types of control systems, which may include various numbers of control channels and various types of monitoring devices and/or actuators.

Figure 1:
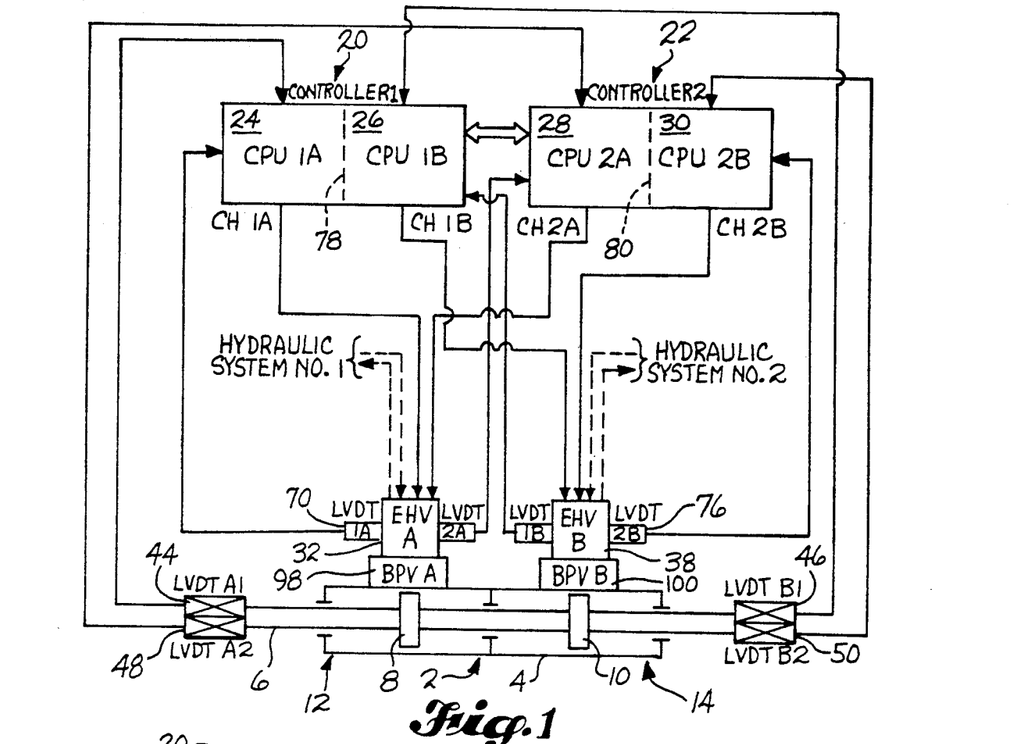
FIG. 1 is a schematic diagram of a type of flight critical control system in which the preferred embodiment of the invention may be used.
Figure 2:
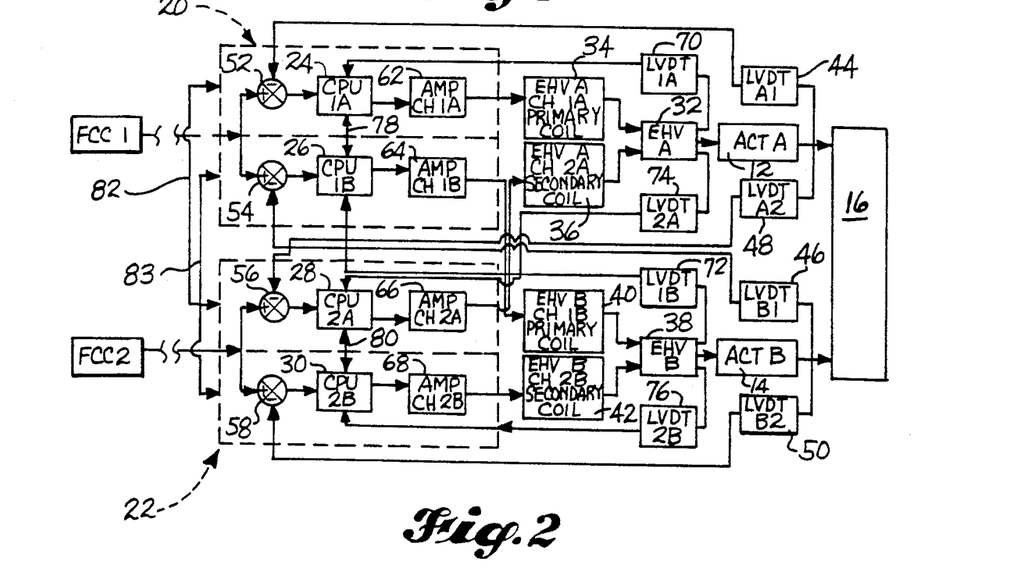
FIG. 2 is a schematic diagram of the system shown in FIG. 1, showing the incorporation of the communication links of the invention and illustrating the pathways of the control and feedback signals.

Referring to Figs. 1 and 2, the control system illustrated therein includes a tandem hydraulic actuator 2 that is coupled to a control surface 16 in a known manner to operate the control surface 16. The actuator 2 is of the same type disclosed in U.S. Pat. No. 4,807,516 and No. 4,887,214, referred to above. The actuator 2 includes a dual-chambered cylinder 4 and an actuating rod 6. The rod 6 carries two piston heads 8, 10, one positioned in each of the cylinder chambers. For convenience, in FIGS. 2, 5, and 7, the respective halves of the actuator 2 are referred to as "Actuator A" ("ACT A") and "Actuator B" ("ACT B"). These actuator halves are also denoted by the reference numerals 12, 14, respectively. The two actuator halves 12, 14 are connected to different hydraulic systems, as illustrated in FIG. 1, so that a single hydraulic system failure will not completely disable the actuator 2.

Still referring to Figs. 1 and 2, the system includes two controllers 20, 22, each of which has two control channels. The primary "controller 1" is designated by the reference numeral 20, and the secondary "controller 2" is designated by the reference numeral 22. As shown in FIG. 2, the primary controller 20 receives a first flight control signal FCC 1, and the secondary controller receives a second flight control signal FCC 2. The system may be fly-by-wire, in which the control signals are electric, fly-by-light, in which the signals are transmitted as light over optical fibers, or a combination of fly-by-wire and fly-by-light. Each of the controllers 20, 22 includes two computers or central processing units (CPU's) 24, 26, 28, 30, one for each control channel. The channels of the primary controller 20 are designated as CH 1A and CH 1B. The channels of the secondary controller 22 are designated as CH 2A and CH 2B. The alphabetic portion of each designation, "A" or "B", refers to the half of the actuator 2 with which the channel is associated. The other elements of the system are similarly referenced to the halves of the actuator 2 by the letters "A" and "B".

As defined herein, each channel CH 1A, CH 1B, CH 2A, CH 2B includes a CPU, the actuator monitoring and valve monitoring devices associated therewith, and the communication links between the CPU and the monitoring devices and between the CPU and the actuator valve. For example, the primary controller 20 includes a first channel CH 1A that controls Actuator A during the normal operation mode of the system, i.e. the mode in which there has been no failure in the system, and during operation of the system following a failure in the secondary channels but before any failure in the primary channels. Channel CH 1A includes a CPU 24, an actuator monitoring device 44, a valve monitoring device 70, and communication links between the CPU 24 and the devices 44, 70 and between the CPU 24 and a valve 32 that controls Actuator A. As shown, the monitoring devices 44, 70 are linear variable differential transformers (LVDT's), and the valve 32 is a dual-coil electrohydraulic servovalve (EHV). The monitoring devices 44, 70 monitor the position of the actuator rod 6 and the valve spool of the valve 32, respectively. The second channel CH 1B of the primary controller 20 similarly includes a CPU 26 and monitoring devices 46, 72. The devices 46, 72 monitor the position of the actuator rod 6 and the position of the valve spool of a valve 38 that controls Actuator B, respectively.

The secondary controller 22 has substantially the same structure as the primary controller 20. Channel CH 2A includes a CPU 28, an actuator monitoring device 48, and a valve monitoring device 74 which monitors the position of the valve spool of valve 32. Channel CH 2B includes a CPU 30, an actuator monitoring device 50, and a valve monitoring device 76 which monitors the position of the valve spool of valve 38.

The basic pathways and processing of the control and feedback signals are illustrated in FIG. 2. Since the processing is the same for each of the four channels, it will only be described in detail with reference to channel CH 1A of the primary controller 20. The CPU 24 of channel CH 1A receives the flight control signal FCC 1 and transmits it to the primary coil 34 of the valve 32 through an amplifier 62. The valve 32 responds to adjust the position of the valve spool in accordance with the signal and thereby adjust the position of the control surface 16 via Actuator A. The actuator monitoring device 44 sends a feedback signal to the CPU 24 representative of the position of the actuator rod 6. Both the flight control signal FCC 1 and the feedback signal from the device 44 are communicated to the CPU 24 through a summer 52. The summer 52 subtracts the feedback signal from the control signal to produce an error signal to be input into the valve 32. This type of control loop is well-known in the art. The loop may include additional elements, such as the known type of bias summer 60 shown in FIGS. 5 and 7. The other channel CH 1B of the primary controller 20 has similar elements, including summer 54 and amplifier 64. It interfaces with the primary coil 40 of the valve 38. The channels CH 2A, CH 2B of the secondary controller 22 each include a summer 56, 58 and an amplifier 66, 68 and interface with the secondary coils 36, 42 of the valves 32, 38, respectively.

A second signal (referred to herein as a "monitoring signal") is transmitted to the CPU 24 by the monitoring device 70. This valve-monitoring second signal is processed to detect faults in the control system, as described further below.

Figure 3:
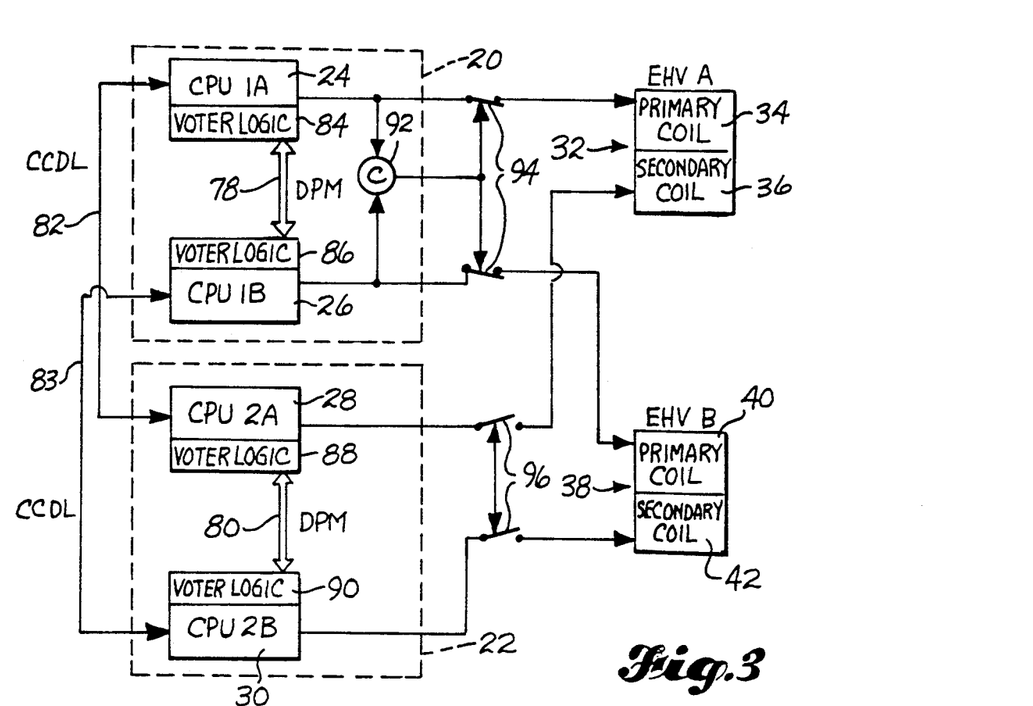
FIG. 3 is a schematic diagram of a portion of the type of system shown in FIGS. 1 and 2, illustrating the incorporation of the voter logic and channel intercommunication features of the preferred embodiment of the invention, with the system shown in its normal operation mode.
Figure 4:
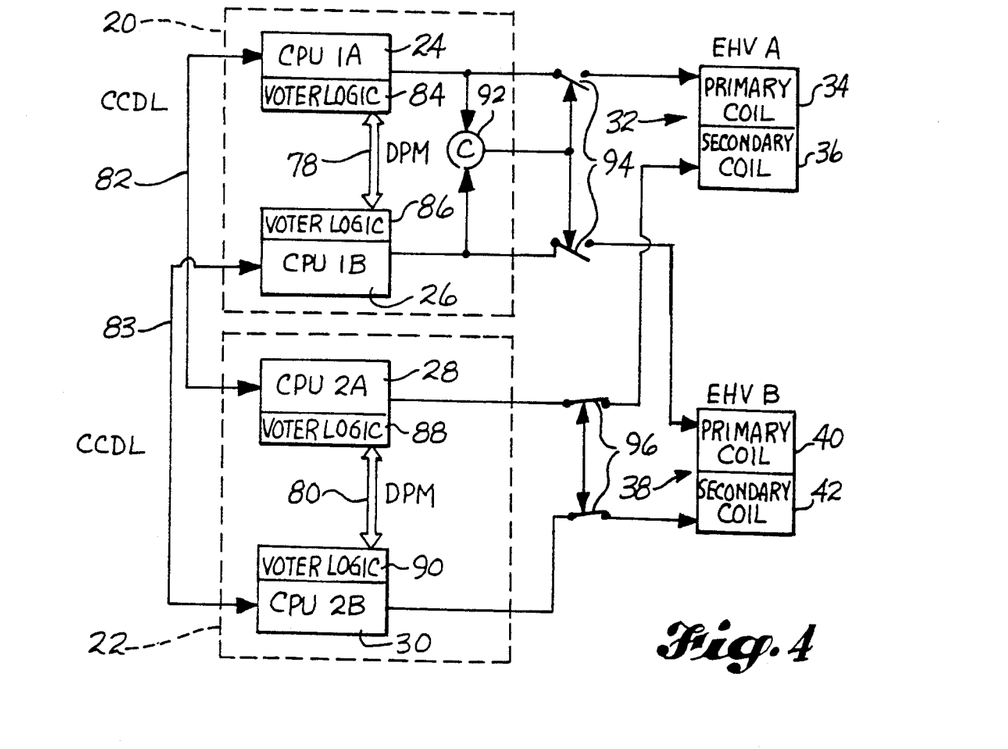
FIG. 4 is like FIG. 3 except that it illustrates the operation of the system following a first fault in one of the primary channels and the switching of control to the secondary channels.

In accordance with the invention, communication links are maintained between the four channels of the system. These links are illustrated in FIGS. 2-5 and 7. They include a dual port memory (DPM) link 78, 80 between the two CPU's of each of the controllers 20, 22. The links 78, 80 extend between the voter logic portions of the CPU's, as described further below. In the preferred embodiment, the links also include two crosschannel datalinks (CCDL's). As shown in FIGS. 3 and 4, the first CCDL 82 extends between the CPU 24 of channel CH 1A of the primary controller 20 and the CPU 28 of channel CH 2A of the secondary controller 22. The second CCDL 83 extends between the CPU's 26, 30 of primary controller channel CH 1B and secondary controller channel CH 2B.

Each CPU 24, 26, 28, 30 includes its own independent voter logic, designated generally by the reference numerals 84, 86, 88, 90 in FIGS. 3 and 4. The combination of the communication links 78, 80, 82, 83 and the voter logic 84, 86, 88, 90 in each of the channels allows a high level of cross-channel voting to virtually eliminate the probability of an undetected failure in the control system. In other words, each channel is capable of receiving signals from the other channels which can be input into the channel's voter logic to produce a determination of whether or not a failure exists in one or more of the other channels.

According to the preferred embodiment of the invention, each of the four channels is monitored by at least one other channel. Each channel includes a deactivating switch responsive to a fault status signal from the other channel or channels that are monitoring it. In other words, if any one of the channels fails, it can be deactivated by another channel even if its failure prevents it from recognizing its own fault status. The deactivating switch may be either a hardware or a software component of the system.

The normal operation mode of the system is illustrated in FIG. 3. This mode of operation corresponds to the state of the system when the system is fully functional and there have been no failures in the system. The configuration illustrated in FIG. 3 also corresponds to the system configuration following a fault in a secondary channel but before any fault in the primary channels. Referring to FIG. 3, both halves of the actuator 2 are controlled by the primary controller 20. The amplified flight control error signal from the CPU 24 of channel CH 1A is communicated to the primary coil 34 of the valve 32 associated with Actuator A to drive Actuator A. Similarly, the amplified error signal from CPU 26 of channel CH 1B is communicated to the primary coil 40 of the valve 38 associated with Actuator B to drive Actuator B. The error signal outputs of the CPU's 28, 30 of the secondary controller 22 are switched out of communication with the valves 32, 38. In FIG. 3, switches 94 are shown closed to communicate the outputs of the CPU's 24, 26 of the primary controller 20 with the valves 32, 38. Switches 96 are shown open to interrupt communication between the CPU's 28, 30 of the secondary controller 22 and the valves 32, 38. The switches 94, 96 are shown in FIG. 3 for the purpose of illustrating the functioning of the system. The placement of the switches may vary from the illustrated configuration. The switches may be hardware or software components, and may be the same elements or separate elements from the deactivating switches referred to above.

FIG. 3 also illustrates an additional feature of the invention which may be included. This feature is the comparator 92 associated with the primary controller 20. The comparator 92 compares the error signal outputs of CPU's 24 and 26. If the outputs differ by more than a predetermined threshold, comparator 92 causes the switches 94 to be opened to interrupt inputs to the valves 32, 38 from the primary controller 20, and control of the actuator 2 to be transferred to the secondary controller 22 through the CCDL's 82, 83. Comparator 92 is preferably a hardware component. Its function is to provide another means of fault detection in addition to the redundant monitoring, interchannel communication, and interchannel deactivation which are the primary focus of the invention. The voter logics 84, 86 of the primary channels CH 1A, CH 1B determine the fault statuses of the primary channels CH 1A, CH 1B on the basis of a predetermined difference threshold that represents a lower deviation tolerance than the threshold associated with the comparator 92. Therefore, the comparator 92 operates as a backup for the voter logics 84, 86. Most failures in the primary controller 20 will be detected by the voter logics 84, 86 and will not trigger an error response of the comparator 92. The comparator 92 is brought into operation to transfer control only when a failure remains undetected, and/or deactivation of the primary channels CH 1A, CH 1B is not accomplished, by the operation of the voter logics 84, 86.

A comparator similar to comparator 92 could also be provided in association with secondary controller 22. However, this is generally not preferred since the automatic interrupting of the secondary controller 22 would complicate the operation of the fault detection system.

FIG. 4 illustrates the configuration of the system following a fault in a channel of the primary controller 20 and the transferring of control to the secondary controller 22. Switches 94 have been opened to interrupt transmission of the flight control error signals from primary controller 20 to the valves 32, 38. Switches 96 have been closed to communicate the secondary controller 22 with the valves 32, 38. The error signal output of the CPU 28 of channel CH 2A is communicated to the secondary coil 36 of valve 32. The error signal output of the CPU 30 of channel CH 2B is communicated to the secondary coil 42 of the valve 38. Thus, both halves of the actuator 2 are being driven by the secondary controller 22.

Referring back to FIG. 1, the control system illustrated therein includes two bypass valves (BPV's) 98, 100. These bypass valves 98, 100 are operated in a known manner to shut off hydraulic pressure to one or the other or sometimes both halves of the actuator 2 in response to failures in the system. Operation of the type of bypass valve illustrated is discussed in U.S. Pats. No. 4,807,516 and No. 4,887,214, cited above. As discussed therein, a bypass valve 98, 100 is preferably not shifted to its bypass position unless both channels corresponding to the actuator half 12, 14 associated with the valve 98, 100 have failed.

The above-described operation of the bypass valves 98, 100 accommodates a preferred feature of the procedure for switching control from the primary controller 20 to the secondary controller 22. Following the switching of such control, the secondary controller 22 preferably determines which channel of the primary controller 20 has failed. This is preferably accomplished by comparing the error output signals of the CPU's 24, 26 of the primary controller 20 with the error output signals of the CPU's 28, 30 of the secondary controller 22. The communication necessary to accomplish this comparison is provided by the CCDL communication links 82, 83. Agreement between the output of a primary controller CPU 24, 26 and the outputs of the secondary controller CPU's 28, 30 indicates a no fault condition in the primary channel. The corresponding CPU 28, 30 of the secondary controller 22 signals the CPU 24, 26 of the primary controller 20 which is in a no fault condition to reactivate to an active/standby status. For example, if the output of CPU 24 of channel CH 1A is the same as the outputs of secondary controller CPU's 28, 30, CPU 28 signals CPU 24 to activate channel CH 1A to an active/standby status. This ensures that channel CH 1A is operational and ready to take over in the event of a failure in secondary channel CH 2A. If the output of channel CH 1B is found to disagree with the outputs of the secondary controller, channel CH 1B remains deactivated.

The corresponding operation of the bypass valves 98, 100 is as follows. When the primary channels CH 1A, CH 1B deactivate and switch control of the actuator 2 from the primary controller 20 to the secondary controller 22, each of the primary channels CH 1A, CH 1B sends a bypass signal to the corresponding valve 98, 100. Neither valve 98, 100 responds since each valve 98, 100 requires two signals before it shifts to its bypass mode. Upon reactivation of a primary controller channel to an active/standby status, the bypass signal to the corresponding valve 98, 100 is discontinued so that, upon failure of the related secondary controller channel, a bypass signal from such secondary channel will not cause shifting of the valve 98, 100 to its bypass mode. The bypass signal from the failed deactivated channel of the primary controller 20 is continued. In the event of a failure in the related secondary controller channel, the second bypass signal from the secondary channel will shift the valve into its bypass mode to prevent the corresponding half of the actuator 2 from interfering with the operation of the control surface 16.

According to the invention, each of the channels of the control system is self-monitoring. The self-monitoring of a channel is accomplished by comparing a monitoring signal to a model signal and determining an operating status based on the results of the comparison. The model signal corresponds to the expected operation of the actuator 2, or more specifically, the operation of the actuator servovalve 32, 38, given the flight control signal FCC 1, FCC 2. The model signal is generated by model logic represented by the blocks 114 in FIGS. 5 and 6. The model logic may be in the form of software or a hardware model logic circuit, either of which may be of a known type. The monitoring signal is representative of the actual operation of the actuator 2 and is produced by the valve monitoring device 70, 72, 74, 76. In each channel, the model signal is produced in, and the monitoring signal is input into, the voter logic portion 84, 86, 88, 90 of the computer 24, 26, 28, 30, which includes comparison logic (comparator 102 in FIGS. 5-8) for comparing the two signals. If there is a difference between the two signals exceeding permissible limits, and the voter logic 84, 86, 88, 90 confirms that there is a failure in the channel, as illustrated in FIGS. 6 and 8, the channel deactivates itself and sends appropriate signals to the other channels to deactivate and/or assume control. For example, when a fault in the primary controller channel CH 1A occurs during the normal mode of operation and the comparison and voter logic of channel CH 1A detect and confirm the failure, channel CH 1A deactivates itself and sends a signal to channel CH 1B to deactivate, and essentially simultaneously signals the secondary channels CH 2A, CH 2B to assume control. In the case of a first failure in the primary channel CH 1B detected by channel CH 1B, channel CH 1B would similarly deactivate itself and signal channel CH 1A and the secondary channels.

As noted above, following a first failure in a primary channel, the nonfailed primary channel is preferably reactivated to an active/standby status. In such an active/standby status, the channel preferably continues its self-monitoring activities. Similarly, the self-monitoring of the secondary channels is preferably continuously carried out in any active or active/standby channel whenever the control system is in operation, regardless of which channels are driving the actuator 2. The self-monitoring activity of the secondary channels during the normal mode of operation helps prevent the occurrence of latent (undetected) failures in the secondary channels. If a secondary channel detects a failure in itself during the normal mode of operation, it deactivates itself so that it will not automatically be activated upon a failure in the corresponding primary channel. It also signals its corresponding primary channel that it has deactivated. This prevents a failure transient from occurring due to an unsuccessful attempt to transfer control to the failed secondary channel.

The detection of a failure in a channel on active/standby status necessarily includes a determination that a false indication of a failure in the channel has not been caused by a failure in its corresponding active channel. Such a false indication can occur since the monitoring signal being received by the standby channel is generated by the operation of a valve which is being driven by the corresponding active channel. Therefore, before deactivating in response to a self-monitoring indication of failure, a standby channel verifies the nonfailure status of the corresponding active channel.

The self-monitoring of the secondary channels following a first failure in the primary channels and transfer of control to the secondary channels operates in the same manner as the self-monitoring of the primary channels in the normal operation mode, except for the types of signals that are generated as a result of the detection of a fault. When a secondary channel detects a fault in itself, it does not signal any other channel to deactivate. Rather, it deactivates itself and signals the corresponding primary channel to activate, if such primary channel is in an active/standby status. If the corresponding primary channel is not in an active/standby status and has been deactivated, the deactivation of the secondary channel results in two bypass signals being sent to the corresponding bypass valve 98, 100 and the complete loss of operation of the corresponding actuator half 12, 14. However, the nonfailed secondary channel remains in operation to drive the other actuator half 12, 14 with the corresponding primary channel on an active/standby status.

The redundant fault monitoring of each channel by the other channel in the same controller is also carried out in the voter logics. In each channel, the model signal and monitoring signal from the other channel are independently compared with the channel's own model signal and monitoring signal to determine a fault status of the other channel. In the preferred embodiment, all four signals are also processed to determine the channel's own fault status. The communication between channels necessary to accomplish the cross comparisons are provided by the dual port memory links 78, 80 between the voter logic portions of the computers.

Figure 5:
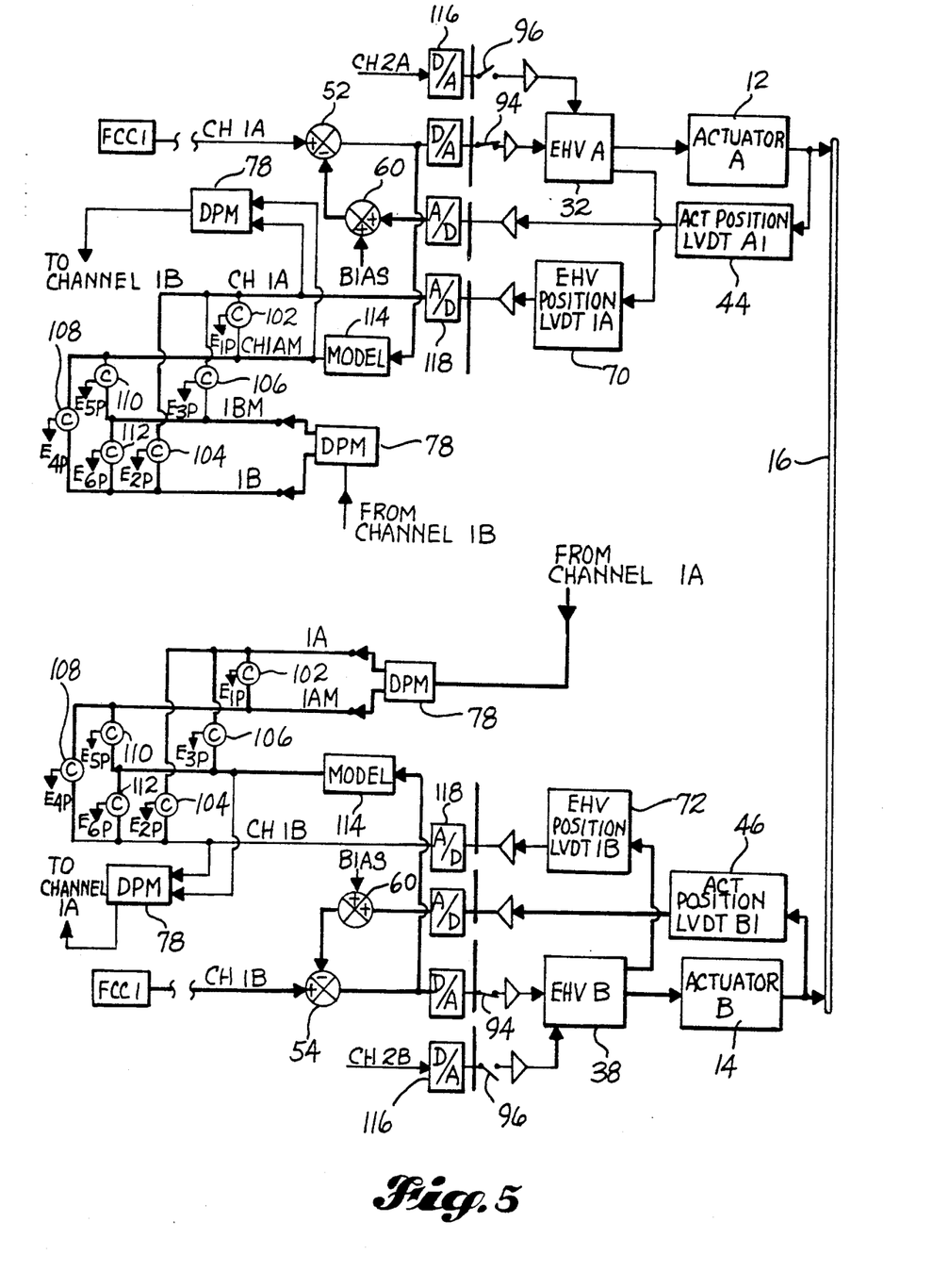
FIG. 5 is a schematic diagram of the preferred embodiment of the invention illustrating the control and feedback pathways and the voter logic in the normal operation mode.
Figure 6:
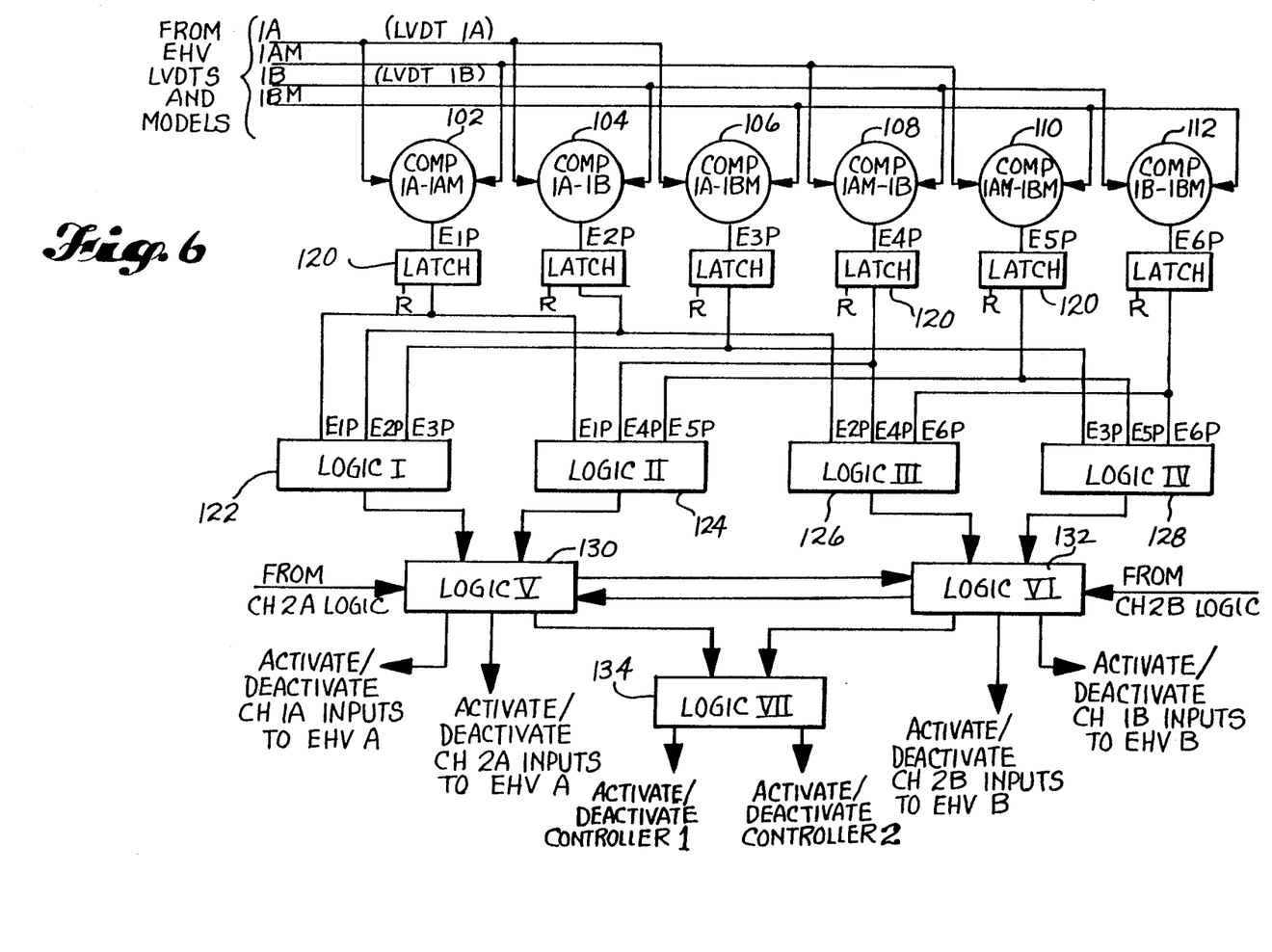
FIG. 6 is a flow diagram further illustrating the voter logic shown in FIG. 5.
Figure 11:
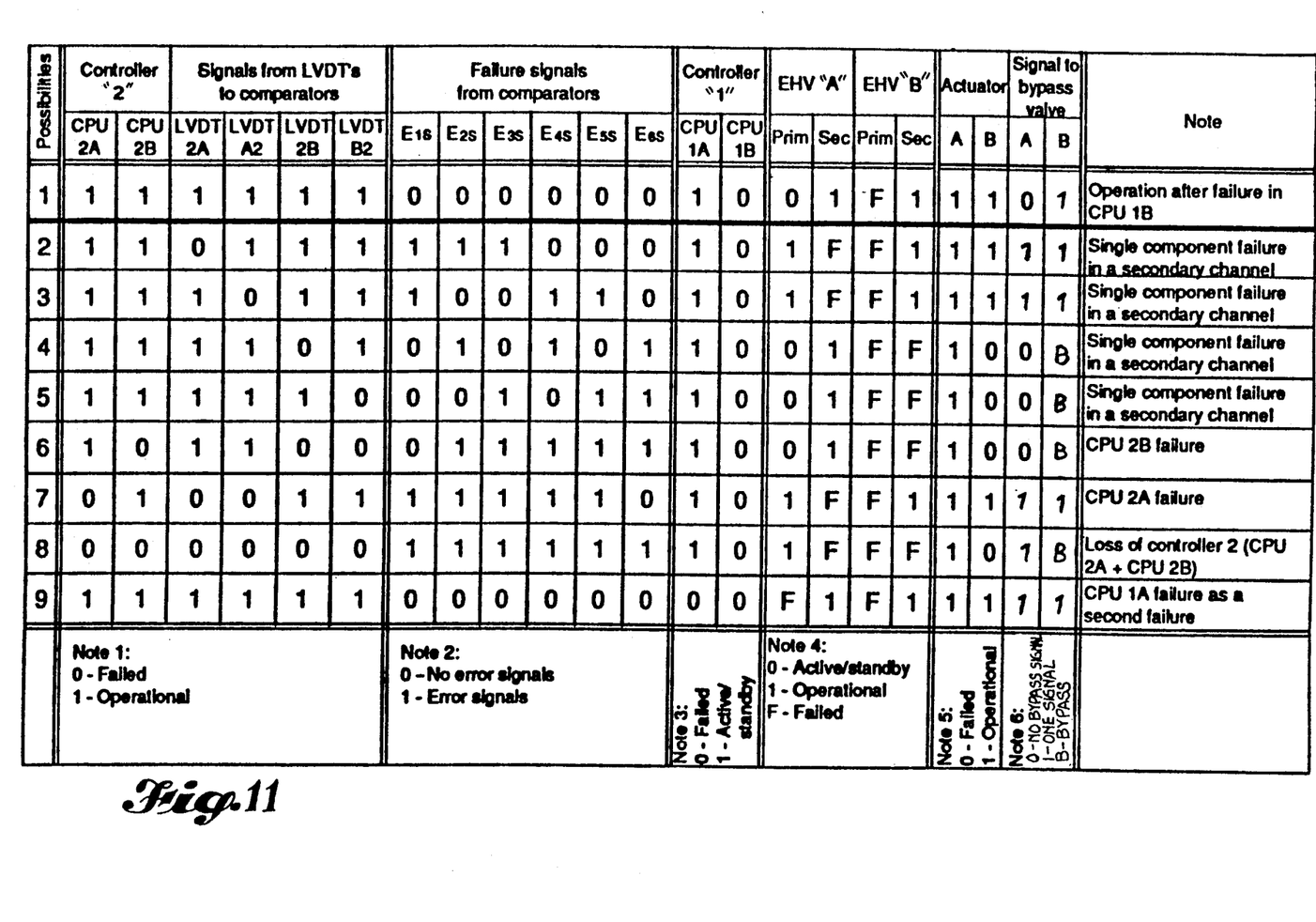
FIG. 11 is a truth table illustrating the voter logic when control has been switched to the secondary channels.

The details of the preferred embodiment of the voter logic of the invention are illustrated in FIGS. 5-8. The results of the operation of the voter logic are further illustrated in the truth tables of Figs. 10 and 11. The voter logic portions of channels CH 1A and CH 1B are shown in the top and bottom portions, respectively, of FIG. 5. FIG. 5 also illustrates the normal operation mode of the control loops of channels CH 1A and CH 1B, including the input of the error signals into the valves 32, 38 and the communication of the feedback signals from the actuator monitoring devices 44, 46. For convenience, dual port memory link 78 is shown four times in FIG. 5 although, in the present preferred embodiment, there would normally be only a single such link 78 between the two channels CH 1A, CH 1B. The boxes 116, 118 in FIG. 5 represent digital to analog converters 116 and analog to digital converters 118, respectively. These converters 116, 118 may be of various known types.

The preferred embodiment of the voter logic portions 84, 86 of the two primary channels CH 1A, CH 1B each have the same structure. Their corresponding elements are assigned like reference numerals in FIG. 5. The elements may be hardware elements but are preferably software elements. Referring to the top portion of FIG. 5, a model signal is generated in the model logic 114 of the voter logic 84 of channel CH 1A. The model signal output of the model logic 114 is communicated to channel 1B through the link 78, and is input into the comparator 102. The monitoring signal from the valve monitoring device 70 is also input into the comparator 102. In the comparator 102, the two signals are compared as described above to make an initial self-monitoring determination of the status of the channel CH 1A as operational or failed. The monitoring signal from device 70 is communicated to channel CH 1B through the link 78.

The voter logic 84 of channel CH 1A receives, from channel CH 1B via link 78, a model signal generated in a corresponding model logic 114 of the voter logic 86 of channel CH 1B and the monitoring signal from the valve monitoring device 72 of channel CH 1B. The four signals are input, in pairs, into the comparator 102 and five additional comparators 104, 106, 108, 110, 112. The outputs of the six comparators are then processed to determine a fault status for each of channels CH 1A, CH 1B and the two model channels. Each comparator 102-112 has input therein a different combination of two of the four signals, so that each comparator compares a different combination of signals. This is illustrated in FIGS. 5 and 6.

The logic elements that process the output of the comparators 102-112 to determine the fault statuses preferably take the form shown in FIG. 6. As shown, the logic includes sublogic elements 122, 124, 126, 128, 130, 132, 134 and latches 120. The output of each comparator 102-112 is determined by the difference between the two input signals into the comparator 102-112. If the difference is less than a predetermined threshold, there is no output. If the difference equals or exceeds the threshold, the output constitutes an error signal $E_{1P}$-$E_{6P}$ and is input into a corresponding latch element 120. Each latch 120 latches in error signals, and has a standard reset terminal R for resetting it following resolution of a fault condition.

Each of the first tier elements 122, 124, 126, 128 is positioned to receive the three possible error signals relating to a different one of the four input signals. For example, element 122 receives the three error signals generated by a comparison of channel CH 1A's monitoring signal (1A in FIG. 6), and element 124 receives the three error signals generated by a comparison of channel CH 1A's model signal (1AM in FIG. 6). The first tier elements coordinate the error signals they receive and send an appropriate signal to the corresponding second tier element 130, 132. For example, if element 122 receives three error signals, it signals element 130 that channel CH 1A has failed. Elements 126, 132 operate in a similar manner relative to channel CH 1B. Second tier elements 130, 132 exchange information, and signal third tier element 134, to generate appropriate activate and/or deactivate signals to the appropriate channels(s) and/or controller(s). As discussed above, each of the primary channels CH 1A, CH 1B has a deactivation switch that is responsive to a fault status signal from the other primary channel. Therefore, a failed channel CH 1A, CH 1B can be deactivated by the independent voter logic of the other channel CH 1A, CH 1B of the primary controller 20 to avoid the undesirable situation of continued operation of a failed channel which cannot recognize its own failure.

As shown in FIG. 6, the inputs into the voter logic 84 of channel CH 1A further include signals from the voter logic portions of channels CH 2A and CH 2B into sublogic elements 130, 132. These inputs help determine what activate/deactivate signals are generated by the channel CH 1A voter logic in response to the detection of a fault in one of the primary channels. For example, if the inputs from the secondary channels, voter logics indicate that both secondary channels are operational and on active/standby status, a detection of a fault in one of the primary channels will result in the deactivating of both primary channels and the essentially simultaneous signaling of the secondary channels to activate described above. If there is a fault in one of the secondary channels, control may still be switched over to the secondary channels since the operational status of one of the secondary channels will guarantee that at least one actuator half 12, 14 remains in operation. However, if both secondary channels have failed, it is not permissible to deactivate the nonfailed primary channel. In such case, the failed primary channel will deactivate itself and/or be deactivated by the nonfailed primary channel, and the nonfailed primary channel will remain active. The flight control system and control surface 16 will remain operational through the actuator half 12, 14 corresponding to the nonfailed primary channel, but will have diminished responsiveness due to the bypassing of the other actuator half 12, 14.

Figure 7:
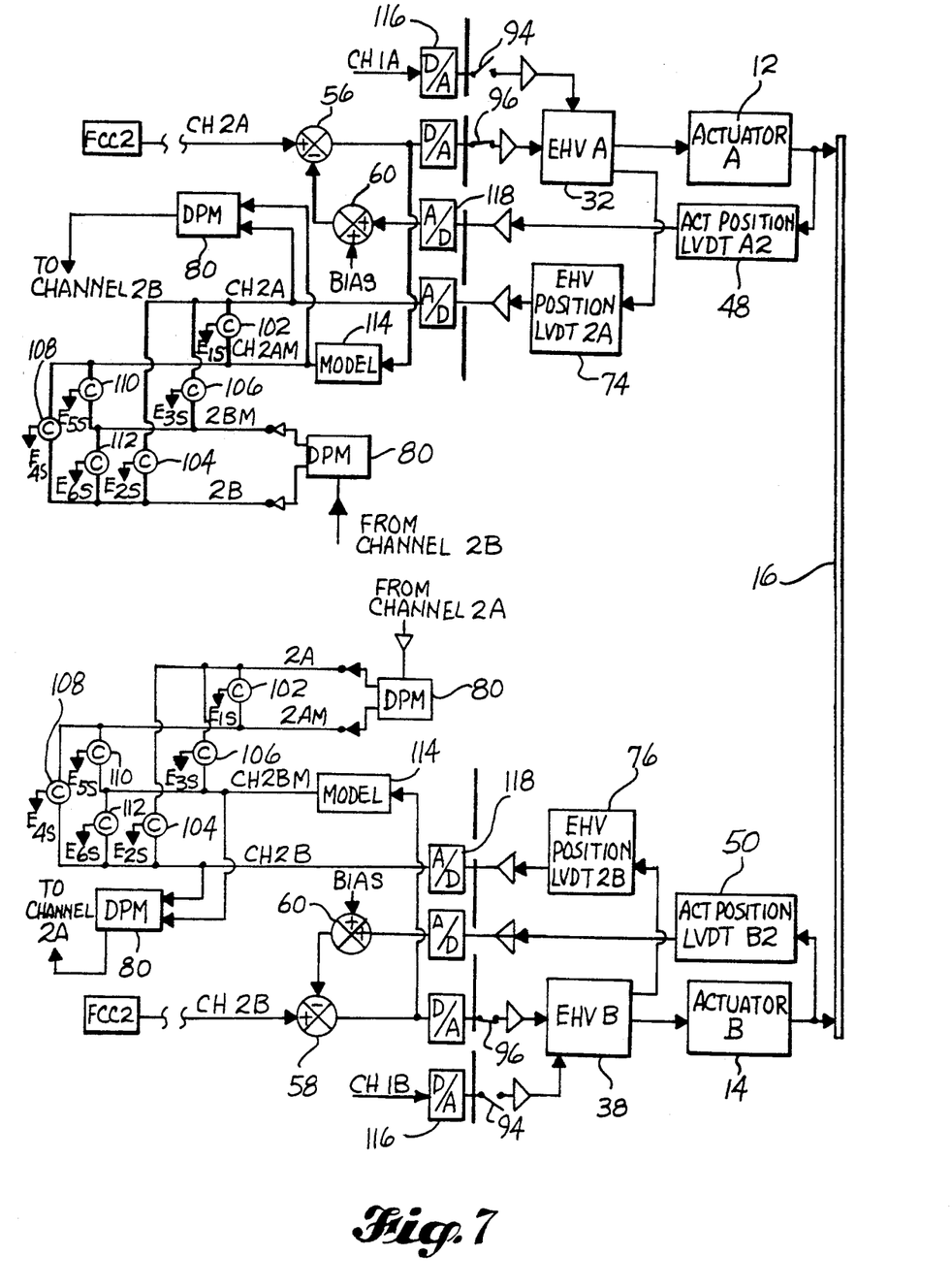
FIG. 7 is like FIG. 5 except that it shows the operation of the secondary controller following a first failure in one of the primary channels.
Figure 8:
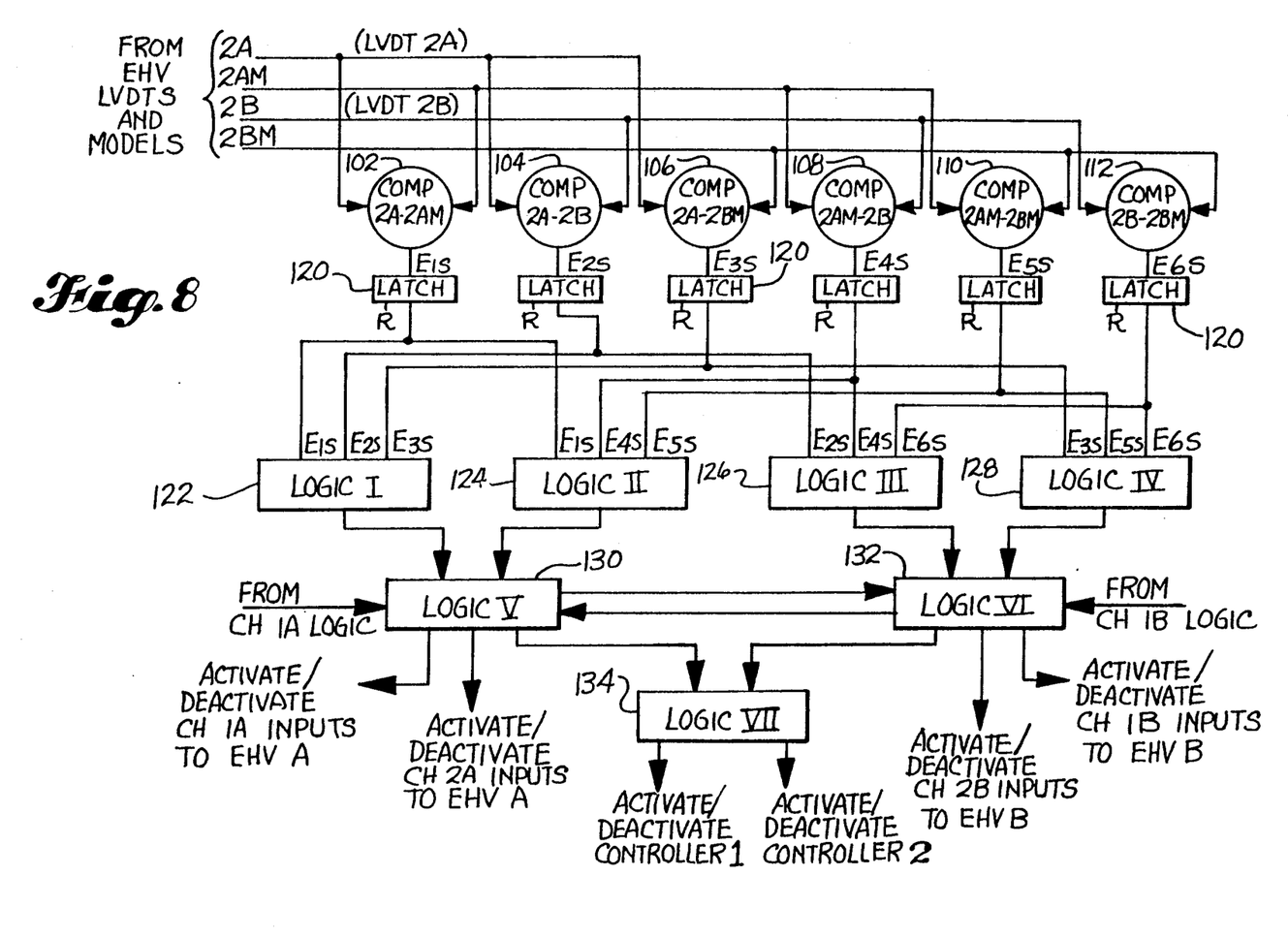
FIG. 8 is like FIG. 6 except that it further illustrates the voter logic shown in FIG. 7.

FIGS. 7 and 8 illustrate the voter logic 88, 90 of the secondary channels CH 2A, CH 2B. The structure of these voter logics 88, 90 and their operation is equivalent to that of the primary channels CH 1A, CH 1B, described above. As shown in FIG. 7, the control system is configured so that each actuator servovalve 32, 38 is receiving input, from its corresponding secondary channel CH 2A, CH 2B.

The above description of the operation of the fault detection system of the invention includes some examples of the reconfiguration of the control system and fault detection system in response to various types and sequences of failures. The reconfiguration of the type of control system illustrated in FIG. 1 is further described in the above-cited U.S. Pat. No. 4,887,214 and is illustrated in FIGS. 6A-6M thereof. The discussion in the patent and the above discussion herein will make clear to those skilled in the art the various reconfiguration possibilities.

Figure 9:
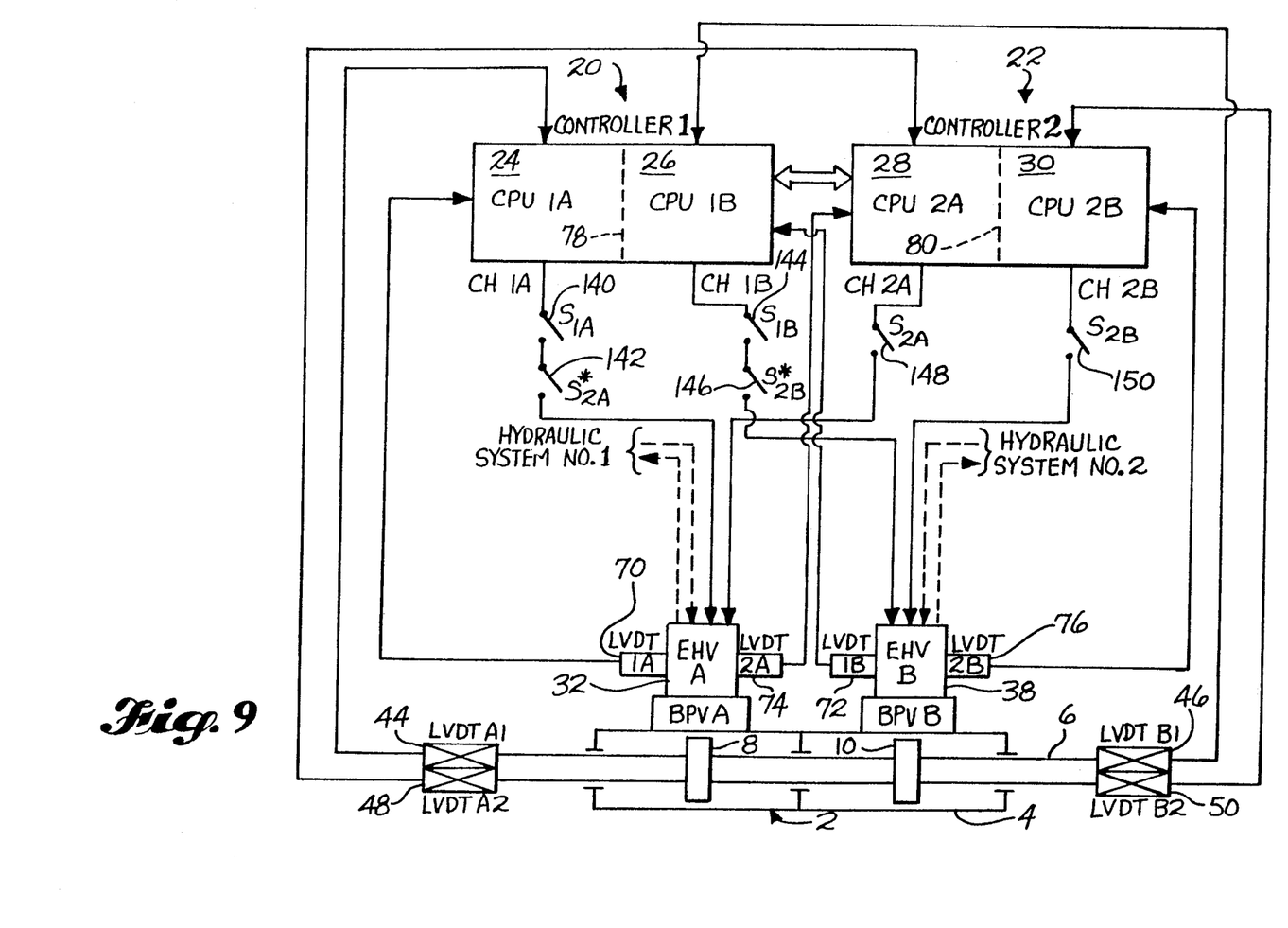
FIG. 9 is a schematic diagram similar to FIG. 1 illustrating the incorporation of a modified version of the preferred embodiment of the invention using dual switching for redundancy and enhanced reliability.

FIG. 9 illustrates a modification of the preferred embodiment of the invention. In this modification, two switches are provided in series in each of the primary channels CH 1A, CH 1B for redundant switching out of a failed primary channel. Channel CH 1A is provided with a switch 140 activated by a signal from the CPU 24 of channel CH 1A and a switch 142 activated by the CPU 28 of its active/standby secondary channel CH 2A. Similarly, channel CH 1B is provided with switches 144, 146 activated by the CPU-s 26, 30 of channels CH 1B, CH 2B, respectively. Each of the secondary channels CH 2A, CH 2B is provided with a single switch 148, 150 activated by the channel CH 2A, CH 2B in which it is positioned. The use of dual switches in the primary channels CH 1A, CH 1B permits the switching out of a failed primary channel when the switch 140, 144 controlled by such channel fails. This modification of the preferred embodiment increases the reliability of the switching out of a failed primary channel. However, it is not currently preferred because the addition of the extra switches 142, 146 present a trade-off in reliability since they are additional elements that are subject to failure, and because the accompanying monitoring of the primary channels by the secondary channels makes the failure detection system more complex.

The preceding discussion of various failure conditions and the resulting reconfigurations, including the discussion in the referenced patent, relates to failures in the control channels themselves and the associated hydraulic systems. Failures can also occur in the interchannel communication links. A failure in one of the dual port memory links 78, 80 results in loss of communication between the two channels of one of the controllers 20, 22 via the failed link 78, 80. However, if intercommunication between the two channels remains through at least one operational cross-channel data link 82, 83, the failure of the link 78, 80 can be ignored and the flight control and fault detection systems remain fully operational. In addition, it is consistent with the invention to switch control of the actuator operation to the secondary channels CH 2A, CH 2B following a failure in the dual port memory link 78 of the primary controller 20.

A failure in one of the CCDL's 82, 83 as a first failure in the communication links does not affect the fully operational status of the fault detection system because communication among the channels remains via the other CCDL 82, 83 and the dual port memory links 78, 80. Loss of both CCDL's 82, 83 in the normal operation mode of the control system, in which the two primary channels are driving the actuator 2, does not have an immediate effect on the operation of the control system since the two primary channels CH 1A, CH 1B remain in communication through the dual port memory link 78 and, therefore, their signals to the valves 32, 38 remain synchronized. However, the loss of communication between the primary and secondary channels due to the loss of both CCDL's 82, 83 may result in drift between the error output control signals of the primary and secondary channels. Upon a subsequent failure in a primary channel and switching of control to the secondary channels, there may be increased failure transients resulting from the loss of synchronization between the primary and secondary channels. Assuming that the drift between the primary and secondary channels and the resulting failure transients are within tolerable limits, the full operation of the control system is recovered once the secondary channels are activated since the error control signals to the two valves 32, 38 are synchronized by the communication between channels CH 2A, CH 2B via the dual port memory link 80. Loss of both CCDL's 82, 83 and the link 80 in the active secondary controller 22 will again result in loss of synchronization. This loss can be compensated by deactivating one of the channels of the secondary controller 22 so that at least one half 12, 14 of the actuator 2 remains in operation.

When both CCDL's have failed, switching of control from the primary to the secondary channels would require a back-up procedure, such as monitoring by the secondary channels of an indicator of primary channel operation. The indicator could be, for example, the operation of the valves 32, 38, or discrete signals from the primary controller (e.g. watchdog timer signals) which are discontinued when a failure occurs. In the preferred embodiment, the valve monitoring is carried out in any case as part of the self-monitoring of the secondary channels. The additional use of the monitoring signals as activating signals, in the event of loss of intercontroller communication, would be relatively easy to carry out.

From the above, it should be apparent that the fault detection system of the invention itself has a high degree of redundancy and fault tolerance. The result is a reduction nearly to zero of the probability of a complete failure of the fault detection system. This, in turn, enhances the virtual elimination of the probability of an undetected failure in the control system.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A method of detecting faults in an aircraft control system having an actuator, and a plurality of control channels for r®receiving control signals and processing said signals to generate output signals for driving said actuator, said method comprising:
   in each said channel, generating a monitoring signal representative of actual operation of said actuator and a model signal corresponding to expected operation of said actuator, comparing said monitoring signal to said model signal, and determining an operating status based on results of said comparing;
   communicating said monitoring signal and said model signal generated in a first one of said channels to a second one of said channels, and communicating said monitoring signal and said model signal generated in said second channel to said first channel;
   in each one of said first and second channels, independently performing comparisons of said monitoring signal and said model signal communicated from the other of said first and second channels and said monitoring signal and said model signal generated in said one of said first and second channels to determine a fault status of each of said first and second channels; and
   maintaining communication links between said channels, including a link between said first channel and said second channel; and providing, in each of said first and second channels, a deactivating switch responsive to a fault status signal from the other of said first and second channels.

2. The method of claim 1, in which said actuator is a dual actuator, and said channels include said first and second channels and two secondary channels; and
   which comprises operating said first and second channels to drive said actuator in a normal operation mode; and, in response to a fault status signal from either of said first and second channels relating to either of said first and second channels, deactivating both of said first and second channels and essentially simultaneously signaling said secondary channels to activate to drive said actuator.

3. The method of claim 2, further comprising, after signaling said secondary channels to activate:
   determining, in said secondary channels, whether there is a no fault condition in either of said first and second channels; and
   signaling any of said first and second channels in which there is a no fault condition to reactivate to an active/standby status.

4. The method of claim 3, in which the step of determining whether there is a no fault condition comprises comparing said output signals of said first and second channels and said secondary channels.

5. The method of claim 1, in which said actuator is a dual actuator, and said channels include said first and second channels and two secondary channels; and
   which further comprises communicating said monitoring signal and said model signal generated in each of said secondary channels to the other of said secondary channels; in each of said secondary channels, independently comparing said monitoring signals and said model signals generated in said secondary channels to determine a fault status of each of said secondary channels; and providing, in each of said secondary channels, a deactivating switch responsive to a fault status signal from the other of said secondary channels.

6. The method of claim 5, comprising operating said first and second channels to drive said actuator in a normal operation mode; and in said normal operation mode, communicating, from said secondary channels to said first and second channels, said fault statuses of said secondary channels.

7. The method of claim 5, comprising operating said first and second channels to drive said actuator in a normal operation mode; and, in response to a fault status signal from either of said first and second channels relating to either of said first and second channels, deactivating both of said first and second channels and essentially simultaneously signaling said secondary channels to activate to drive said actuator.

8. The method of claim 7, comprising, in said normal operation mode, communicating, from said secondary channels to said first and second channels, said fault statuses of said secondary channels.

9. The method of claim 7, further comprising, after signaling said secondary channels to activate:
   determining, in said secondary channels, whether there is a no fault condition in either of said first and second channels; and
   signaling any of said first and second channels in which there is a no fault condition to reactivate to an active/standby status.

10. The method of claim 9, in which the step of determining whether there is a no fault condition comprises comparing said output signals of said first and second channels and said secondary channels.

11. The method of claim 10, comprising, in said normal operation mode, communicating, from said secondary channels to said first and second channels, said fault statuses of said secondary channels.

12. The method of claim 9, comprising, in said normal operation mode, communicating, from said secondary channels to said first and second channels, said fault statuses of said secondary channels.

13. The method of claim 1, in which the step of independently performing comparisons comprises comparing said model signal and said monitoring signal communicated from the other of said first and second channels to each other, and comparing each of said signals communicated from the other of said first and second channels to each of said model signal and said monitoring signal generated in said one of said first and second channels.

14. A method of detecting faults in an aircraft control system having an actuator, and a plurality of control channels for receiving control signals and processing said signals to generate output signals for driving said actuator, said method comprising:

in each said channel, generating a monitoring signal representative of actual operation of said actuator and a model signal corresponding to expected operation of said actuator, comparing said monitoring signal to said model signal, and determining an operating status based on results of said comparing;

communicating said monitoring signal and said model signal generated in a first one of said channels to a second one of said channels, and communicating said monitoring signal and said model signal generated in said second channel to said first channel;

in each one of said first and second channels, independently performing comparisons of said monitoring signal and said model signal communicated from the other of said first and second channels and said monitoring signal and said model signal generated in said one of said first and second channels to determine a fault status of each of said first and second channels; and maintaining communication links between said channels, including a link between said first channel and said second channel; and providing, in each of said first and second channels, a deactivating switch responsive to a fault status signal from the other of said first and second channels;

wherein said method comprises providing first and second predetermined difference thresholds, said second threshold representing a greater deviation tolerance than said first threshold; determining said fault statuses on a basis of said first threshold; and comparing said output signals of said first and second channels to determine a failure status based on said second threshold.

15. In an aircraft control system having an actuator, and a plurality of control channels for receiving control signals and processing said signals to generate output signals for driving said actuator, a fault detection system comprising:

in each said channel, a monitoring device that interfaces with said actuator to sense actual operation of said actuator and that generates a monitoring signal, model logic for generating a model signal representative of expected operation of said actuator, and comparison logic for comparing said monitoring signal with said model signal;

communication links between said channels, including a link between two of said channels for transmitting said model signals and said monitoring signals in both directions between said two of said channels;

in each of said two of said channels, voter logic for independently comparing said model signals and said monitoring signals of said two of said channels to determine a fault status of each of said two of said channels, said voter logic including said comparison logic; and in each of said two of said channels, a deactivating switch responsive to a fault status signal from either of said two of said channels.

16. The fault detection system of claim 15, in which said actuator is a dual actuator, said two of said channels are primary channels, and said channels include said primary channels and two secondary channels; in which said communication links include a link between said secondary channels for transmitting model signals and monitoring signals in both directions; and which further comprises, in each of said secondary channels, voter logic for independently comparing said monitoring signals and said model signals of said secondary channels to determine a fault status of each of said secondary channels, and a deactivating switch responsive to a fault status signal from either of said secondary channels.

17. The fault detection system of claim 16, in which said communication links comprise a link between said secondary channels and said primary channels.

18. The fault detection system of claim 15, further comprising a comparator for comparing said output signals of said two of said channels.

19. The fault detection system of claim 15, in which said voter logic comprises logic for comparing each one of said model signals and said monitoring signals of said two of said channels to each of the others of said model signals and said monitoring signals of said two of said channels, to produce six separate outputs; and logic for determining said fault status of each of said two of said channels based on said six separate outputs.

* * * * *

UNITED STATES PATENT AND TRADEMARK OFFICE
CERTIFICATE OF CORRECTION

PATENT NO. : 5,274,554
DATED : December 28, 1993
INVENTOR(S) : Imre J. Takats and Charles C. Chenoweth It is certified that error appears in the above-identified patent and that said Letters Patent is hereby corrected as shown below:

Column 7, line 53, "crosschannel" should be -- cross-channel --.
Column 13, line 8, "channels," should be -- channels' --.
Column 13, line 57, "CPU-s" should be -- CPU's --.
Claim 1, column 15, line 19, "r®receiving" should be
    -- receiving --.

Signed and Sealed this

Ninth Day of August, 1994

Attest:

BRUCE LEHMAN

Attesting Officer

Commissioner of Patents and Trademarks